United States Patent [19]

Fukuma et al.

[11] Patent Number: 4,802,732

[45] Date of Patent: Feb. 7, 1989

[54] OPTICAL FIBER CABLE PREVENTING WATER FROM SPREADING TOWARD CABLE INTERIOR

[75] Inventors: Masumi Fukuma; Nobuhiro Akasaka, both of Kanagawa, Japan

[73] Assignee: Sumitomo Electric Industries, Ltd., Osaka, Japan

[21] Appl. No.: 98,839

[22] Filed: Sep. 21, 1987

[30] Foreign Application Priority Data

Sept. 19, 1986 [JP] Japan .............................. 61-221384
May 13, 1987 [JP] Japan .............................. 62-116659

[51] Int. Cl.$^4$ .............................................. G02B 6/44
[52] U.S. Cl. ............................... 350/96.23; 350/96.34; 523/173
[58] Field of Search .......................... 350/96.23, 96.34; 174/23 R, 23 C; 523/173

[56] References Cited

U.S. PATENT DOCUMENTS

| | | | |
|---|---|---|---|
| 4,308,416 | 12/1981 | Herman et al. | 174/23 C |
| 4,388,485 | 6/1983 | Zeidler et al. | 174/23 C |
| 4,401,366 | 8/1983 | Hope | 350/96.23 |
| 4,458,105 | 7/1984 | Roenisch et al. | 174/23 R X |
| 4,525,026 | 6/1985 | Elion | 350/96.23 |
| 4,703,998 | 11/1987 | Uchioke et al. | 350/96.23 |

Primary Examiner—John D. Lee
Attorney, Agent, or Firm—Sughrue, Mion, Zinn, Macpeak & Seas

[57] ABSTRACT

Disclosed is an optical fiber cable which prevents water from running or spreading toward the cable interior. The optical fiber cable comprises at least one optical fiber unit, an outermost sheath member, and a water absorbing and swelling member. The optical fiber unit includes a central spacer formed with grooves, and at least one coated optical fiber or optical fiber tape disposed in each of the grooves. The outermost sheath member surrounds the optical fiber unit, and the water absorbing and swelling member is filled in spaces defined between the optical fiber unit and the outermost sheath member. The water absorbing and swelling member comprises a non-water absorbing and non-swelling base and water absorbing and swelling material fixed to a surface of the base. In another embodiment of the invention, the water absorbing and swelling member is in the form of a tape in which a layer of water absorbing and swelling material is bonded to one or both surfaces of a film like flexible base. The water absorbing and swelling tape member is disposed in grooves of the spacer together with optical fiber tapes.

9 Claims, 3 Drawing Sheets

OPTICAL FIBER CABLE PREVENTING WATER FROM SPREADING TOWARD CABLE INTERIOR

BACKGROUND OF THE INVENTION

The present invention relates to an optical fiber cable which includes at least one optical fiber unit in which at least one coated optical fiber or optical fiber tape is accommodated in a groove formed on a rod-like spacer. More particularly, the present invention relates to the optical fiber cable which has a water running preventive function so as to prevent water from spreading in the cable interior when an outer sheath of the cable is damaged to allow water to enter thereinto. The present invention also relates to an optical fiber cable which includes at least one optical fiber unit. The unit includes a central rod-shape spacer, a plurality of optical fiber tapes accommodated in each of a plurality of grooves formed on an outer peripheral surface of the rodshaped spacer, and an outer support winding disposed over the spacer.

Throughout the specification and claims, the term "optical fiber tape" implies a tape in which a plurality of optical fibers are embedded in parallel to one another.

Generally, in the optical fiber cable, water or moisture may enter the cable interior if an outermost sheath of the cable is subjected to damage, and various disadvantages may occur such as degradation of optical fiber strength and degradation of transmission characteristic due to freezing. Therefore, conventionally, tapes, braids and particles formed of a material having water absorbing and swelling characteristics are embedded in spaces or gaps in the optical fiber cable in order to absorb water or moisture and to block the water.

According to the conventional water blockage type optical fiber cable which accommodates therein at least one optical fiber unit, there are large spaces in volume between the outer peripheral surface of the optical fiber unit and the outermost sheath member of the cable. Therefore, a large amount of water absorbing and swelling material is required in order to satisfactorily the space. However, since the material is expensive, the resultant water blockage type optical fiber cable also becomes expensive. Therefore, it is impractical for use in actual practice in light of production costs.

SUMMARY OF THE INVENTION

It is therefore, an object of the present invention to overcome the above-mentioned drawbacks and to provide an improved water blockage type optical fiber cable.

Another object of this invention is to provide such cable which can minimize variations in the water blocking characteristic along the length of the cable, and to provide a cable having high quality water absorbing and swelling characteristic.

Still another object of the present invention is to provide such cable which can eliminate local water permeable impediment.

Briefly, an optical fiber cable in accordance with the present invention, includes an outermost sheath, and at least one optical fiber unit housed in the sheath, and the optical fiber unit includes a rod-like spacer, a plurality of coated optical fibers and/or optical fiber tapes disposed in grooves formed on an outer peripheral surface of the spacer and aligned in the radial direction thereof. A primary feature resides in water absorbing and swelling member embedded in a space defined between the optical fiber unit and and outermost sheath, and the absorbing and swelling member comprises non-water absorbing and swelling base and water absorbing and swelling material fixed to a surface of the non-water absorbing and non-swelling base. With this structure, the gaps in the cable are occupied mainly by the non-water absorbing and non-swelling base, so that amount of water absorbing and swelling material can be reduced in comparison with the conventional water blockage type optical fiber cable, so that economical cable results. Further, since water absorbing and swelling materials are fixed to the outer peripheral surface of the non-absorbing and non-swelling base, direct surface contact between the non-water absorbing and non-swelling bases can be eliminated, and direct contact between the non-absorbing and non-swelling base and another non-absorbing and nonswelling member in another cable can be eliminated. As a result, a high degree of water blockage is obtainable. Furthermore, water absorbing and swelling material can be embedded into fine or minute spaces, so that an excellent degree of water blockage is attainable.

Another type of a optical fiber cable includes an optical fiber unit in which provided are; a rod-like spacer, and at least one optical fiber tape disposed in each of a plurality of grooves formed on an outer peripheral surface of the spacer. The optical fiber unit comprises at least one dead-water-tape disposed in the groove of the spacer together with the optical fiber tapes. The dead-water-tape includes a film like flexible substrate and a layer of water absorbing and swelling material adhered to either one side or both sides of the flexible substrate. The water absorbing and swelling layer is a coating layer formed on the substrate. The coating layer comprises a rubber or synthetic resin and a water absorbing and swelling materials each having a particle diameter of 50 micron meters which is dispersed in the rubber or the synthetic resin. Alternatively, the coating layer comprises cross-linked polyethylene oxide in which polyethylene oxide having average molecular weight of not less than 20000 is blended with 0.1 to 1.0% by weight of two functional or three functional cross-linking agent, and cross-linking reaction is performed.

DETAILED DESCRIPTION OF THE PREFERRED EMBODIMENTS

Figure 1A:
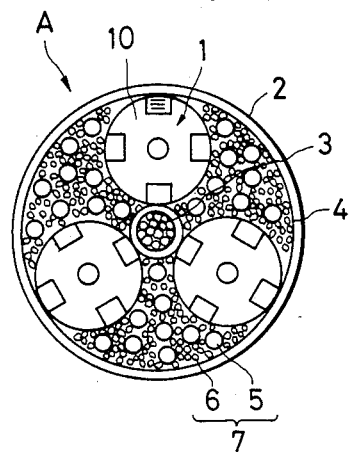
FIG. 1(a) is a cross-sectional view showing an optical fiber cable according to a first embodiment of the present invention.

Various embodiments of the present invention will be described with reference to accompanying drawings. Referring first to a first embodiment shown in FIGS. 1(a) and 1(b), three optical fiber units 1 are accommodated in an optical fiber cable A. In each of the optical fiber units 1, coated optical fibers or optical fiber tapes are disposed in grooves formed on an outer peripheral surface of a rod-like spacer 10. The optical fiber units are housed in an outermost sheath member 2. A tensile member 3 extends through a center portion of the cable A so as to provide mechanical strength of the cable A. The optical fiber units disposed radially outwardly with the tensile member 3 are made up into a bundle and supported by a winding tape 4 disposed radially outwardly with respect to the tensile member 3. Water absorbing and swelling members 7 are disposed in spaces or gaps defined between the optical fiber units and the tape windings 4.

Figure 1B:
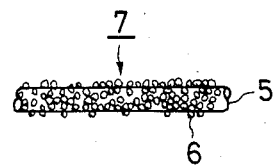
FIG. 1(b) is a perspective view showing a water absorbing and swelling member used in the optical fiber cable.

As shown in FIG. 1(b), the water absorbing and swelling member 7 includes a non-water absorbing and nonswelling base 5 and water absorbing and swelling material 6 fixed to an outer peripheral surface of the base 5. The base 5 is cheaper than the water absorbing and swelling material 6, and has a mechanical strength much higher than that of the material 6. A tape or braid composed of polyethylene is available as the base member.

The water blockage type optical fiber cable shown in FIGS. 1(a) and 1(b) uses inexpensive non-water absorbing and non-swelling base 5 which occupies almost all the spaces in the cable, and therefore the amount of expensive water absorbing and swelling material 6 can be greatly reduced in comparison with the conventional cable of the same type.

Further, since the water absorbing and swelling material 6 is fixed to the outer peripheral surface of the non-water absorbing and non-swelling base 5 formed of the polyethylene tape or braid which has sufficient mechanical strength, the resultant water absorbing and swelling member 7 can sustain a tensile force which is applied thereto during cable assembling process.

Furthermore, the water absorbing and swelling member 7 comprises the non-water absorbing and non-swelling base 5 and water absorbing and swelling material 6 fixed to the outer peripheral surface of the base 5. Therefore, there is no surface contact between the non-water absorbing and non-swelling bases 5. As a result, the cable provides excellent water blocking function or excellent performance for preventing water running through the cable, and water absorbing and swelling materials are uniformly distributed in the spaces of the cable even into the minute gap portions.

Figure 2A:
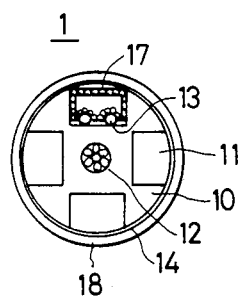
FIG. 2(a) is a schematic cross-section showing an optical fiber unit housed in the optical fiber cable.
Figure 2B:
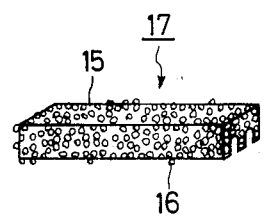
FIG. 2(b) is a perspective view showing a water absorbing and swelling member used in the optical fiber unit.

FIGS. 2(a) and 2(b) show an optical fiber unit 1 employed in the optical fiber cable shown in FIGS. 1(a) and 1(b). The unit includes a rod-like spacer 10 formed with grooves 11, a tensile member 12, two coated optical fibers 13 disposed in each of the grooves 11, a support winding 14 surrounding the spacer 10 for accommodating the coated optical fibers into the grooves 11, an outer sheath 18 disposed over the support winding 14, and a water absorbing and swelling member 17 for water blocking and protecting the coated optical fibers 13 in the grooves 11.

FIG. 2(b) shows the water absorbing and swelling member 17. The member 17 is engageable with the grooves 11 of the spacer 10. The member 17 includes a non-water absorbing and non-swelling base 15 whose configuration is so arranged as to fit with the groove 11 and the outer peripheral surfaces of the fibers 13, and water absorbing and swelling material 16 fixed to the entire outer peripheral surface of the base 15.

Figure 3A:
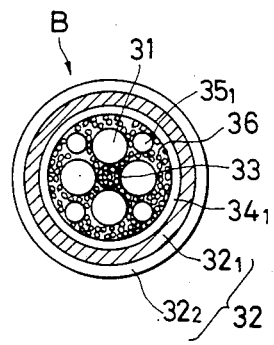
FIG. 3(a) is a cross-sectional view showing an optical fiber cable according to a second embodiment of the present invention.
Figure 3B:
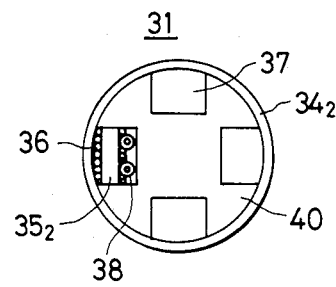
FIG. 3(b) is a schematic cross-section showing an optical fiber unit used in the second embodiment.

FIGS. 3(a) and 3(b) show a water blockage type optical fiber cable according to a second embodiment of the present invention. The cable B shown in FIG. 3(a) provides four optical fiber units 31 shown in FIG. 3(b) having an outer diameter of 10 mm. According to each of the optical fiber units 31 shown in FIG. 3(b), spacer 40 made of polysilicone is formed with four grooves 37 at its outer peripheral surface. Each of the groove 37 has a width (circumferential length) of 1.3 mm and depth (radial length) of 1.0 mm. In each of the grooves 37, two coated optical fibers 38 having outer diameter of 0.5 mm are disposed. In FIG. 3(b), only one of the grooves is delineated to be filled with the fibers, and other optical fibers in the other grooves are omitted. However, these also should be disposed in the remaining three grooves. In each of the grooves, a water absorbing and swelling member is also disposed together with the two coated optical fibers 38. The water absorbing and swelling member includes a non-water absorbing and non-swelling base $35_2$ made of polyethylene tape having a width of 1.7 mm and thickness of 0.2 mm, and water absorbing and swelling material 36 implanted in the polyethylene tape. The water absorbing and swelling particles 36 are produced by cutting fibers by every 0.4 mm to provide particle configuration, the fibers being formed of a copolymer of acrylic acid salt, acrylic acid and acrylonitrile. A support winding $34_2$ is disposed over the outer peripheral surface of a spacer 40.

In the water blockage type optical fiber cable B shown in FIG. 3(a), four optical fiber units 31 shown in FIG. 3(b) are disposed, and water absorbing and swelling members are filled in spaces of the cable B. The water absorbing and swelling members filled in the cable B includes braid-like non-water absorbing and swelling bases $35_1$ made of polyethylene terephthalate and having an outer diameters of 5 mm, and water absorbing and swelling material 36 fixed to the outer surfaces of the braid base $35_1$. The material 36 are produced by cutting fibers by every 0.4 mm to provide particle configuration, the fiber being formed of copolymer of acrylic acid salt, acrylic acid and acrylonitrile. Four water absorbing and swelling members are assembled around the tensile member 33 and between the neighbouring optical fiber units 31, and the assembly is covered by support winding $34_1$, and further, an outermost sheath 32 is provided over the support winding $34_1$. The outermost sheath 32 includes an aluminum tube $32_1$ disposed over the support winding $34_1$ and an external winding 32₂ disposed over the aluminum tube. Further, the above-mentioned water absorbing and swelling particulate materials 36 are filled within a space defined between the support winding 34₁ and the assembly of four optical fiber units 31 and four water absorbing and swelling members. Incidentally, the support winding 34₁ is also formed of water absorbing and swelling material comprising copolymer a of acrylic acid salt, acrylic acid and acrylonitrile.

A water blockage type optical fiber cable was prepared having an axial length of 1 km according to the embodiment shown in FIGS. 3(a) and 3(b). As a result, about 1.3 kg of water absorbing and swelling material 36 was required. On the other hand, also prepared was a water blockage type optical cable having the same axial length according to the conventional structure wherein spaces in the cable was occupied by only the water absorbing and swelling materials. As a result, about 2.2 kg of water absorbing and swelling material was required. Therefore, required amount of the water absorbing and swelling material in the present invention was 60% of that in the conventional cable.

Figure 5:
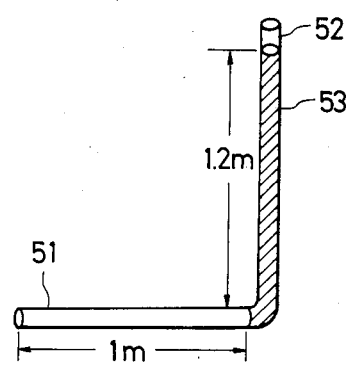
FIG. 5 is an explanatory illustration showing water permeable test.

Further, prepared were thirty cables each having an axial length of 1 m according to the embodiment shown in FIGS. 3(a) and 3(b) and according to the conventional cables. These cables were subjected to water permeable test shown in FIG. 5. that is, test pieces 51 having the length of 1 m was laid horizontally, and a pipe 52 having an axial length not less than 1.2 m was connected to one end of the test piece 51. The pipe 52 was maintained in vertical direction, and water was injected into the pipe 51 so that the water level became 1.2 m from the horizontal plane of the test piece 51. Such state was maintained for 24 hours, and water permeating length through the test piece was measured in each of the test pieces by disassembling the piece 51.

As a result of experiments, the thirty test pieces of water-blockage type optical fiber cables according to the present invention provided average water permeating length of 22 cm, and standard deviation of variation was 12 cm. On the other hand, according to the thirty test pieces of the conventional cables, average water permeating length was 24 cm, which may be similar to the permeating length of the present invention. However, in the conventional cables, standard deviation of variation was 21 cm which is extremely longer than that of the present invention. Therefore, it is apparent that the water blockage type optical fiber cable according to the present invention provides less variation in water permeating length than that of the conventional water blockage type optical fiber cable.

Figure 4A:
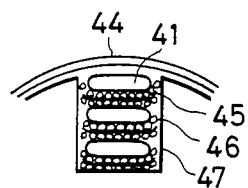
FIGS. 4(a) and 4(b) are cross-sectional views showing essential portions of optical fiber units according to still other embodiments of the present invention.
Figure 4B:
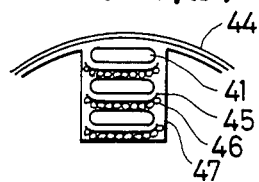

FIGS. 4(a) and 4(b) show cross-sectional views showing essential portions of optical fiber units according to still two more embodiments of the present invention. These units are accommodated in the optical fiber cable shown in FIG. 3(a). In the optical fiber unit shown in FIG. 4(a), three optical fiber tapes 41 are stacked on each other, and are accommodated in a groove 47 of a spacer. Each of the fiber tapes 41 has a width of 1.1 m and thickness of 0.3 mm. Between the neighbouring tapes 41, a water absorbing and swelling member is disposed and accommodated in the groove 47 together with the optical fiber tapes 41. The water absorbing and swelling member includes non-water absorbing and non-swelling base 45 made of polyethylene terephthalate tape having a width of 2 mm and thickness of 0.03 mm, and water absorbing and swelling material 46 fixed to both surfaces of the tape base 45.

The water absorbing and swelling material 46 is prepared cutting fibers by every 0.4 mm to produce particulate bodies, the material 46 being made of a copolymer of acrylic acid salt, acrylic acid and acrylonitrile. A support winding 44 is provided at the outer surface of the spacer.

According to an embodiment shown in FIG. 4(b), the water absorbing and swelling materials 46 are fixed to one of the surfaces of the non-water absorbing and nonswelling tape base 45.

The optical fiber unit shown in FIGS. 4(a) and 4(b) have outer diameters of 10 mm and are formed with four grooves 47, which structures are similar to that of the second embodiment shown in FIG. 3(b). However, the groove 47 has a width of 1.8 mm and depth of 2.6 mm, and three optical fiber tapes 41 are accommodated in each of the grooves.

The optical fiber units shown in FIGS. 4(a) and 4(b) were housed in the optical fiber cables shown in FIG. 3(a), and the cables having axial length of 1 km was prepared. These cables were cut every 1 m, so that thirty pieces were prepared in each cables. These test pieces were subjected to water blockage tests by a method shown in FIG. 5, and test results are shown in a Table below.

|  | cable having units shown in FIG. 4(a) | Cable having unit Shown in FIG. 4(b) |
| --- | --- | --- |
| average water permeating length (cm) | 40 | 45 |
| standard deviation (cm) | 21 | 31 |

As is apparent from the above table, both optical fiber cables provide excellent water blocking efficiencies.

In the foregoing embodiments, coated optical fibers or optical fiber tapes are disposed in the grooves of the spacers. However, the present invention is also available with a structure wherein at least one conductor wire is also disposed together with the fibers or tapes in the grooves of the spacers, and such unit is disposed in the optical fiber cable.

According to the water-blockage type optical fiber cable of the present invention, specific water absorbing and swelling members comprising inexpensive non-water absorbing and non-swelling base and expensive water absorbing and swelling materials fixed to the base fill the spaces defined between the optical fiber unit(s) and the outermost sheath of the optical fiber cable, and if necessary, in the spaces in the grooves formed on the spacer of the optical fiber unit, the grooves disposing therein the coated optical fibers or optical fiber tapes. Therefore, the amount of the expensive water absorbing and swelling material can be greatly reduced, and the direct contact between non-water absorbing and non-swelling bases and between the non-water absorbing and non-swelling base and the base of other cable component is prevented. Accordingly, water-blockage type optical fiber cable is produceable at low cost, and the cable provides less variation of water permeability along its length, to thereby provide highly sophisticated product.

Figure 6:
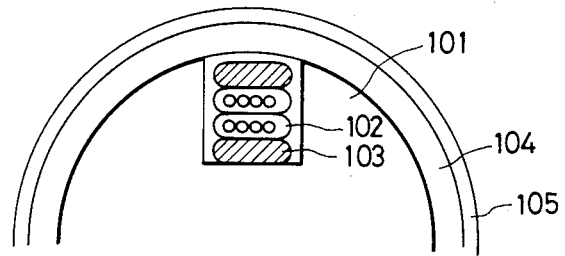
FIG. 6 is a schematic cross-section showing an essential portion of an optical fiber cable according to still another embodiment of the present invention.
Figure 7:
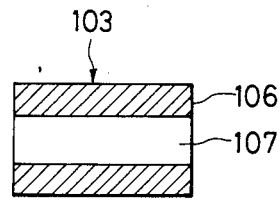
FIG. 7 is a cross-sectional view showing a dead-water tape according to the present invention.

Still another embodiment of the present invention will now be described with reference to FIG. 6. In FIG. 6, a rod-like spacer 101 is formed with at least one groove in which a plurality of optical fiber tapes 102 and a plurality of water blockage tapes 103 are disposed. In this embodiment, two tapes 102 and two tapes 103 are disposed. A lapping sheath 105 is provided over a support winding 104 disposed over the spacer 101. The water blockage tapes 103 shown in FIG. 7 includes a film-like flexible substrate 107 and water absorbing and swelling layers 106 coated on both surfaces of the substrate 107. The substrate is of tape form and has a width of 1.0 to 3.0 mm and thickness of 15 to 100 micron meters, preferably 25 micron meters in thickness. The water absorbing and swelling layer 106 is formed by dispersing water absorbing and swelling material having particle diameter of not more than 50 micron meters into rubber or synthetic resin.

The film-like flexible substrate 107 is formed of a plastic material such as polyethylene terephthalate, polyethylene, polyvinyl chloride etc. However, metal foil such as aluminum foil is also applicable as the substrate if it has flexibility.

The rubber or synthetic resin having elasticity is the constituent of the water absorbing and swelling material 106 as described above. With respect to the rubber available is a natural rubber and a synthetic rubber such as butadiene rubber, isoprene rubber, butyl rubber, butadiene-styrene rubber, butadiene-acrylonitrile rubber, chloroprene rubber, ethylene propylene rubber, acrylic rubber, chlorosulfonic polyethylene rubber, etc. The synthetic resin may be ethylene-vinyl acetate copolymer, saponified material thereof, polyvinyl chloride, polyvinyl chloride copolymer, polyethylene, polypropylene, polyethylene-acrylic acid salt copolymer, ethylene-propylene copolymer, acrylonitrile-butadiene copolymer, styrene-butadiene copolymer, polyester, polyamide resin, acrylic resin, polystyrene, etc. Incidentally, when rigid synthetic resin is used, such resin should be softened by adding suitable plastic agent.

The water absorbing and swelling material which constitutes the water absorbing and swelling layer 106 in combination with the rubber or synthetic resin has particle size not more than 50 micron meters. There is no restriction with respect to the material of the water absorbing and swelling material so far as it is water insoluble and it can absorb water in an amount 10 to 100 times as large as a weight of the material. For example, the water absorbing and swelling material may be a starch, a hydrolysis product of acrylonitrile graft polymer, a neutralizing product of starch and acrylic acid graft polymer, a saponified product of vinyl acetate-acrylic acid ester copolymer, acrylonitrile copolymer, a hydrolysis product of acrylamide copolymer, a cross-linking product of acrylonitrile copolymer and acrylamide copolymer, polyacrylic acid sodium of self-cross linking type obtained by reversed phase-suspension polymerization, cross-linking material of partially neutralizing polyacrylic acid, a cross-linking product of isobutylenemaleic anhydride copolymer, a cross-linking product of polyethylene oxide, etc. Such water absorbing and swelling material must have particle diameter not more than 50 micron meters. If the particle diameter exceeds 50 micron meters, frictional resistance between the water blockage tape and the optical fiber tape is increased. Therefore, the optical fiber tapes are not easily displaceable in the groove, so that residual tensile strain is generated.

The water absorbing and swelling layer 106 is produced by dissolving the rubber or synthetic resin in an organic solvent which does not allow water absorbing and swelling material having particle size not more than 50 micron meters to be dissolved. The organic solvent may be n-pentane, n-octane and benzene. The water absorbing and swelling material is added to and blended with the organic solvent dissolving therein the rubber or synthetic resin, and the mixture is coated or impregnated onto the surface of the film-like flexible substrate 107, and thereafter, these are subjected to drying.

Another kind of water-blockage tape 103 can be produced by cross-linking polyethylene oxide as a water absorbing and swelling layer 106 coated over the substrate 107. That is, two functional or three functional crosslinking agent having 0.1 to 1 part by weight with respect to the cross-linking polyethylene oxide is mixed with polyethylene oxide having average molecular weight of not less than 20000 and the mixture is subjected to crosslinking reaction, so that the water absorbing and swelling layer is obtained.

Various types of polyethylene oxide having average molecular weight of not less than 20000 are conceivable, for example, SUMIKAGEL R 30L, product of Sumitomo Chemical Co., Ltd.

The cross-linking agent may be an isocyanate cross-linking agent such as aliphatic isocyanate and aromatic isocyanate, a dicarboxylic acid cross-linking agent such as phthalic acid and succinic acid, a diol cross-linking agent such as 1.4-butanediol and polyoxy propylene glycol, and a diamine cross-linking agent such as hydroxypropylethylenediamine. Among these, isocyanate cross-linking agent is preferable. This cross-linking agent having 0.1 to 1% by weight relative to the polyethylene oxide is blended therewith, and cross-linked. As a result, obtained is a cross-linked polyethylene oxide which is soluble in various types of solvent, and which is not affected by ambient temperature change, and having suitable melting point. If the water absorbing and swelling layer is affected by ambient temperature, the layer may be easily melted at the temperature of −40° to 100° C., and the melted layer may be bonded to the optical fiber tape, so that bending of the fiber is restrained, and thermal expansion thereof is also restrained. As a result, transmission loss may be increased. If not more than 0.1% of cross-linking agent is used, the cross-linking density may be excessively low, so that it's melting point is lowered and melt viscosity is also lowered. Therefore, the layer may be melted by ambient temperature change, and the melted layer will be in close contact with the coated optical fiber. Reversely, if the amount of the cross-linking agent exceeds 1.0%, solubility of the agent with respect to solvent is lowered, so that resultant mixture becomes incapable of coating. In view of the above, the amount of the cross-linking agent must be from 0.1 to 1.0% with respect to polyethylene oxide amount.

Figure 8A:
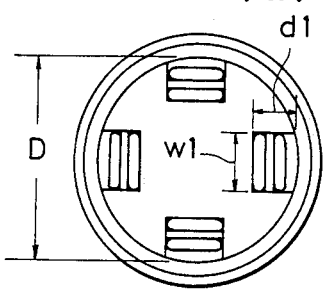
FIGS. 8(a) to 8(c) are schematic cross-sections showing essential portions according to the present invention; and, FIG. 9 is an explanatory illustration showing water permeable test.
Figure 8C:
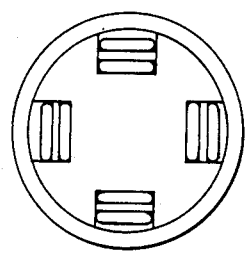
Figure 8B:
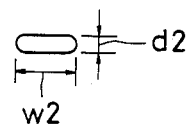

The organic solvent containing cross-linking polyethylene oxide is coated or impregnated on at least one surface of the film-like flexible substrate, and the solvent is subjected to drying, to thereby produce water-blockage tape. FIGS. 8(a) to 8(c) show structure whose friction coefficient would be approximately the same as that of the embodiment shown in FIG. 7. This water-blockage tape includes a water absorbing and swelling layer formed of above-mentioned cross-linking polyethylene oxide, and therefore, resultant tape provides excellent absorbing properties against both fresh water and ionic water.

Therefore, the optical fiber cable employing the above-described water blockage tape is also effective for absorbing ionic water and sea water. Therefore, the cable can be installed regardless of environmental conditions. Further, since the water absorbing and swelling layer is formed of the above-mentioned cross-linking polyethylene oxide, the layer is not dissolved regardless of the ambient temperature change, and further, the layer does not come into contact with the optical fiber tape, thus prevent degradation of the transmission characteristic of the optical fiber tape. Next an example according to this embodiment will be described.

Prepared were ethylene propylene rubber as a synthetic rubber, a water absorbing material, SUMIKA-GEL (Trademark of Sumitomo Chemical Co. Ltd.), which is a ploymer of sodium acrylate and has a particle diameter of not more than 50 micron meters, and peroxide cross linking agent. With respect to 100 parts by weight of ethylene proplylene rubber, 5 parts by weight of cross-linking agent, were blended and 400 parts by weight of water absorbing material. 80 parts by weight of toluene was added to provide solution, and the mixed solution was coated on both surfaces of a film made of polyethylene terephthalate having thickness of 25 micron meters and width of 1.5 mm. These coatings were dried, and obtained was a water blockage tape provided with water absorbing and swelling layers having thickness of 50 micron meters at each surface of the film. These water blockage tapes were assembled in an optical fiber cable whose essential construction is shown in FIGS. 8(a) through 8(c). In the cable, the outer diameter D of the rod-like spacer was 7 mm. The spacer was formed with four grooves whose width wl was 1.6 mm, and depth dl was 1.5 mm. Two optical fiber tapes shown in FIG. 8(b) were disposed in each of the grooves, and a single water blockage tape was disposed in each of the grooves. Each of the optical fiber tapes contained four optical fibers arranged parallely to one another and having a thickness d2 of 0.4 mm and width w2 of 1.1 mm. With respect to the outer winding, prepared a water absorbing tape was prepared in fibrous form made of copolymer of acrylic acid, acrylic acid salt and acrylonitrile. The water absorbing tape had a thickness of 0.25 mm and width of 25 mm. Further, aluminum tape having a thickness of 0.2 mm and polyethylene layer having 1.2 mm in thickness were further provided over the outer winding.

Figure 9:
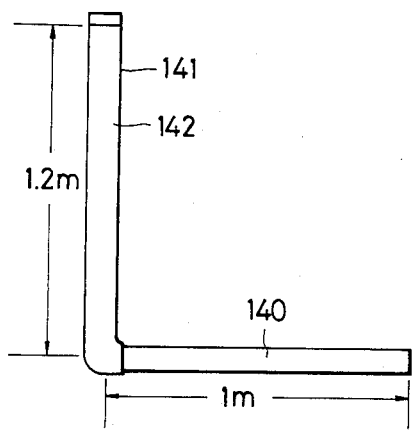

The optical fiber cable thus produced was subjected to water blockage testing (water permeable test), and bending strain of the cable was measured. Regarding water permeable testing, cable test piece 140 having an axial length of 1 m was laid in horizontal direction, and one end of the cable was connected to a pipe 141 directed in vertical direction as shown in FIG. 9. Water 142 having a water level of 1.2 m was filled in the pipe 141. Water permeability reaching to the other end of the test piece 140 was investigated after 24 hours with respect to 25 test pieces. As a result of experiment, there was no water passing throughout the entire length of the test pieces.

Bending strain was from 0.28 to 0.25% when the cable was bent at bending radius of 300 mm. This strain does not provide a critical problem in the cable.

In view of the foregoing, according to the embodiment of this invention, a single or plurality of water blockage tapes are accommodated in each of the grooves of the spacers together with the optical fiber tapes, the water blockage tapes comprising the film like flexible base and water absorbing and swelling layer bonded to one or both surfaces of the flexible base. Therefore, workability in cable branching or connection is improved, and operator is protected from hazards of pollution. Resultant cable provides excellent water blocking characteristics with minimized bending strain.

More specifically, if jelly material such as polybutene or petrolatum group is used as water or moisture absorbing material, such material generally provides cohesiveness, and organic solvent must be used in order to wipe off the material. Therefore, workability in cable connection may be lowered if such jelly material is used. Instead of the jelly material, water absorbing and swelling material in particulate forms can be used which is filled within a cable interior to cut off water. The particulate form is available if it is filled in grooves of a spacer so as to prevent an increase in transmission loss due to side pressure applied to the optical fiber disposed in grooves of the spacer. This particulate form is proposed in National convention 273 of electronics transmission department held in 1986.

However, if the water absorbing and swelling material in particulate form is filled in the grooves of the spacer, the particulate materials are dispersed or scattered, so that the working atmosphere may be polluted. These particles may enter into the human body due to respiration, which causes public hazard.

According to the embodiment shown in FIGS. 6 to 8(c) of the present invention, the problem of the jelly material can be eliminated. Further, since the water absorbing and swelling material in particulate form is bonded to the film like flexible base, scattering the particles or environmental pollution can be avoided, to thus protect human beings.

Further, in a general type of optical fiber cable wherein a plurality of optical fiber tapes are accommodated in spiral grooves formed on an outer peripheral surface of the spacer, strain may be applied to the optical fiber tape due to frictional contact between the optical fiber tapes. That is, if the cable is bent, spirally arranged optical fiber formed with coating provides tensile strain at a tensile side of the fiber and compression strain at a compression side thereof. When the optical fiber is displaced in the groove, the strain is removed. However, in a cable structure wherein the optical fiber tape and the water blockage tape are arranged, frictional resistance between the optical fiber tape and the water blockage tape and between the water blockage tape and the rod-like spacer becomes critical. If the surface frictional resistance of the water blockage tape is higher than the frictional resistance between the optical fiber tape and the spacer and between the optical fiber tapes, displacement of the optical fiber tapes in the grooves is restrained. As a result, strain applied to the optical fiber tape is not released, so that the tensile strain may remain in the optical fiber tape. For example, in an extreme case, the residual tensile strain may be not less than 1% at maximum level when the cable is bent at bending radius of 300 mm. In general, the tensile strain must be controlled to not more than 0.3% at bending radius of 300 mm. If the strain becomes 1% or more, reliability of the optical fiber is greatly reduced. However, according to the present embodiment, the problem of the tensile strain is solved by the employment of specific water absorbing and swelling member described above.

While the invention has been described in detail and with reference to specific embodiments thereof, it will be apparent for those skilled in the art that various changes and modifications can be made therein without departing from the spirit and scope of the invention.

What is claimed is:

1. An optical fiber cable comprising:
   an optical fiber unit comprising:
   a rod-like spacer formed with a plurality of grooves at its outer peripheral surface, and
   at least one optical fiber tape disposed in each of said grooves; and,
   at least one water blockage tape disposed in each of said grooves of said spacer in said unit together with said optical fiber tape, said water blockage tape comprising,
   a film like flexible base member, and a water absorbing and swelling member bonded to at least one surface of said base member, said water absorbing and swelling member is formed of a cross-linked polyethylene oxide comprising,
   polyethylene oxide having average molecular weight of not less than 20,000; and
   one of two functional cross linking agent and three functional cross linking agent, having 0.1 to 1% by weight relative to said polyethylene oxide.

2. The optical fiber cable as defined in claim 1, wherein said water absorbing and swelling member in a form of particle whose particle diameter is not more than 50 micron meters.

3. The optical fiber cable as defined in claim 1, wherein said film like flexible base member and said water absorbing and swelling member are bonded together by one of rubber and synthetic resin.

4. The optical fiber cable as defined in claim 1, wherein said water absorbing and swelling member is produced by the steps of mixing and aggitating a water absorbing and swelling material with one of rubber and synthetic resin, coating the mixed material onto said film like flexible base member, and heating and drying said mixed material.

5. The optical fiber cable as defined in claim 1, wherein said film like flexible base member comprises a polyethylene terephthalate film.

6. The optical fiber cable as defined in claim 1, wherein said water absorbing and swelling member is formed from the acrylic acid salt group.

7. The optical fiber cable as defined in claim 1, wherein said water absorbing and swelling member is produced to cutting fibers by a constant lengths and implanting them in said base member.

8. The optical fiber cable as defined in claim 7, wherein said water absorbing and swelling member is composed of a copolymer of acrylic acid salt, acrylic acid and acrylonitrile.

9. The optical fiber cable as defined in claim 1, wherein said water absorbing and swelling member is subjected to a cross-linkng reaction.

* * * * *

REEXAMINATION CERTIFICATE (1294th)

United States Patent [19]
Fukuma et al.

[11] B1 4,802,732
[45] Certificate Issued  May 29, 1990

[54] OPTICAL FIBER CABLE PREVENTING WATER FROM SPREADING TOWARD CABLE INTERIOR

[75] Inventors: Masumi Fukuma; Nobuhiro Akasaka, both of Kanagawa, Japan

[73] Assignee: Sumitomo Electric Industries, Inc. Ltd., Osaka, Japan

Reexamination Request:
No. 90/001,857, Oct. 5, 1989

Reexamination Certificate for:
Patent No.: 4,802,732
Issued: Feb. 7, 1989
Appl. No.: 98,839
Filed: Sep. 21, 1987

[30] Foreign Application Priority Data

Sep. 19, 1986 [JP] Japan .................. 61-221384
May 13, 1987 [JP] Japan .................. 62-116659

[51] Int. Cl.$^5$ ............................. G02B 6/44
[52] U.S. Cl. ................. 350/96.23; 350/96.34; 523/173
[58] Field of Search ............. 350/96.23, 96.34; 174/23 R, 23 C; 523/173

[56] References Cited
U.S. PATENT DOCUMENTS
4,767,184  8/1988  Ogasawara et al. ............. 350/96.23

FOREIGN PATENT DOCUMENTS
0024631  3/1981  European Pat. Off.

*Primary Examiner*—John D. Lee

[57] ABSTRACT

Disclosed is an optical fiber cable which prevents water from running or spreading toward the cable interior. The optical fiber cable comprises at least one optical fiber unit, an outermost sheath member, and a water absorbing and swelling member. The optical fiber unit includes a central spacer formed with grooves, and at least one coated optical fiber or optical fiber tape disposed in each of the grooves. The outermost sheath member surrounds the optical fiber unit, and the water absorbing and swelling member is filled in spaces defined between the optical fiber unit and the outermost sheath member. The water absorbing and swelling member comprises a non-water absorbing and non-swelling base and water absorbing and swelling material fixed to a surface of the base. In another embodiment of the invention, the water absorbing and swelling member is in the form of a tape in which a layer of water absorbing and swelling material is bonded to one or both surfaces of a film like flexible base. The water absorbing and swelling tape member is disposed in grooves of the spacer together with optical fiber tapes.

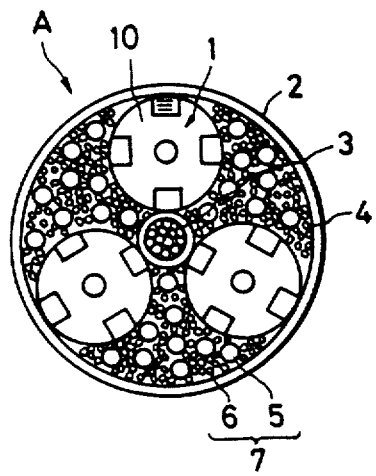

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-9 is confirmed.

* * * * *